Feb. 14, 1967 W. RUF 3,303,723
STEERING GEAR FOR TRACKED VEHICLES
Filed Nov. 29, 1963 3 Sheets-Sheet 2

United States Patent Office 3,303,723
Patented Feb. 14, 1967

3,303,723
STEERING GEAR FOR TRACKED VEHICLES
Walter Ruf, Landhaus am See, Bottighofen,
Thurgau, Switzerland
Filed Nov. 29, 1963, Ser. No. 326,950
Claims priority, application Germany, May 9, 1963,
R 35,145
6 Claims. (Cl. 74—665)

The invention relates to a steering gear for tracked vehicles and more particularly for tanks in which the shafts for the chain drive wheels of the vehicle may be connected positively by means of adjustable engaging members with each other or with the drive shaft of a stepped transmission gear connected in series to the engine of the vehicle.

There are already known in the art steering gears for tracked vehicles, connected in series with the stepped transmission gear unit, and comprising several gears in coaxial arrangement, connected positively with the track drive wheels or with the stepped transmission gearing, and capable of being coupled one with the other by means of shift sleeves or bushes.

It is therefore a principal object of the invention to provide an improved steering gear which may be operated more easily and without expenditure of power and which makes possible, in the case of failure of the operating members, to steer the vehicle for towing away.

It is another object of the invention to provide a steering gear which is operable by means of a pressure medium, and more particularly by means of compressed air, and which may be moved by means of an auxiliary mechanical device into the main operating positions, if the supply of the pressure medium should fail.

It is another object of the invention to provide a steering gear of simple and robust construction which may be easily repaired even under adverse conditions and which offers in its operation all advantages which are otherwise inherent only in expensive and complicated hydraulic units so that the steering gear according to the invention is particularly suitable for light tanks and armored vehicles.

Other objects, advantages and uses of the invention will become apparent as the description proceeds.

In this novel steering gear, there are preferably arranged four coaxial gears, of which the two center gears are each connected positively with a shaft for a chain drive wheel, whilst the two outer gears are driven in the opposite sense of rotation by the engine of the vehicle through the stepped gearing unit. The gears may be interconnected by means of two shift sleeves.

This last embodiment of the invention has the advantage of enabling the vehicle to travel in reverse in all gears available for the travel in the forward direction. This arrangement eliminates a separate reverse gear in the stepped transmission gearing unit.

Conveniently, the shift sleeves are operated by two compressed air cylinders. One of these two compressed air cylinders may contain two pistons, one of which slides telescopically in the other.

According to a particularly preferred embodiment of the invention; the shift sleeves are associated with springs, whereby these sleeves are urged into a vehicle towing position when the compressed air cylinders are relieved of pressure; in this position, the two gears associated with the chain drive wheels are interconnected one with the other, without, however, being coupled to the vehicle engine. This arrangement has the special advantage that in the case of failure of the compressed air supply, say, as a consequence of enemy fire, the vehicle remains in a towable position and may be steered during the towing.

According to this preferred embodiment of the invention, in the towing position it is possible to engage forward travel by operating the first piston of the first compressed air cylinder, counter-running of both chains by operating the piston of the second compressed air cylinder, and reverse by the subsequent operation of the second piston of the first compressed air cylinder.

Furthermore, the auxiliary equipment actuable by means of a Bowden cable, acts preferably on the shift sleeve associated with the first compressed air cylinder so that the same may be moved out of the towing position into the forward travel position and, by entraining the other adjusting sleeve, into the reverse travel position.

The invention will be further explained, by way of example, with reference to the accompanying drawings, showing a preferred embodiment of the invention, and in which.

Figure 1:
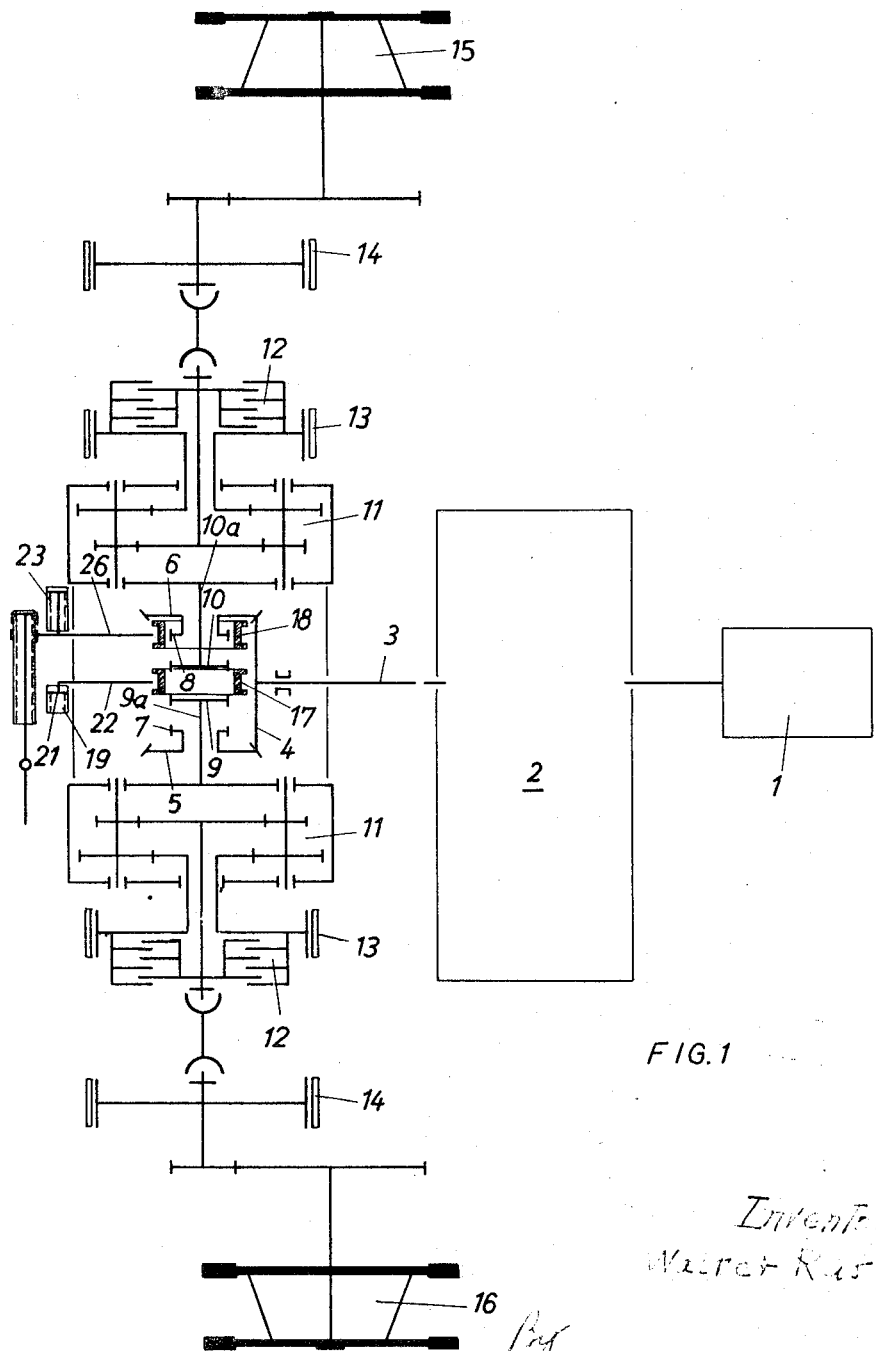
FIG. 1 shows diagrammatically the entire steering gear.

The vehicle engine, not shown, drives through a clutch 1 a stepped transmission unit 2, containing only forward gears, but no reverse gears. The clutch 1 and the stepped transmission 2 may be of any construction known in the art, and are indicated in FIG. 1 merely by boxes. These parts require no detailed description. The stepped transmission 2 is connected with the input shaft 3 of the steering gear, carrying a bevel gear 4. Bevel gears 5 and 6, arranged coaxially to the bevel gear 4, and revolving in opposite directions, mate with this gear 4, and are rigidly connected with gear wheels 7 and 8, forming the input coupling member of the steering gear. Between the gears 7 and 8, there are coaxially mounted two further gears 9 and 10, forming the output coupling member of the steering gear, and connected to output shafts 9a and 10a. These output shafts 9a and 10a are connected each through a planetary gearing 11, via a clutch 12 to a brake 13, and through a further brake 14 to chain drive wheels 15 and 16. Operation of the brakes 13 and 14 enables the vehicle to be steered, whilst the planetary gearing units 11 effect the necessary adjustment.

In addition, there are provided shift sleeves 17 and 18, by means of which the gears 7, 8, 9 and 10 may be coupled in pairs. The shift sleeve 17 is operated by means of a compressed air cylinder 19, containing a piston 21, entraining the shift sleeve 17 by means of a lever 22. The shift sleeve 18 is operated by means of a compressed air cyinder 23, containing a first hollow piston 24. A second piston 25 is slidably located in the hollow piston 24. The piston 25 is connected by a lever 26 with the shift sleeve 18.

Figure 2:
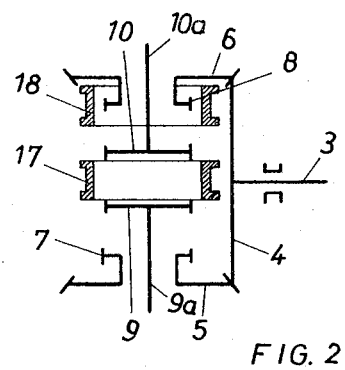
FIG. 2 shows diagrammatically the steering gear in the towing position.
Figure 6:
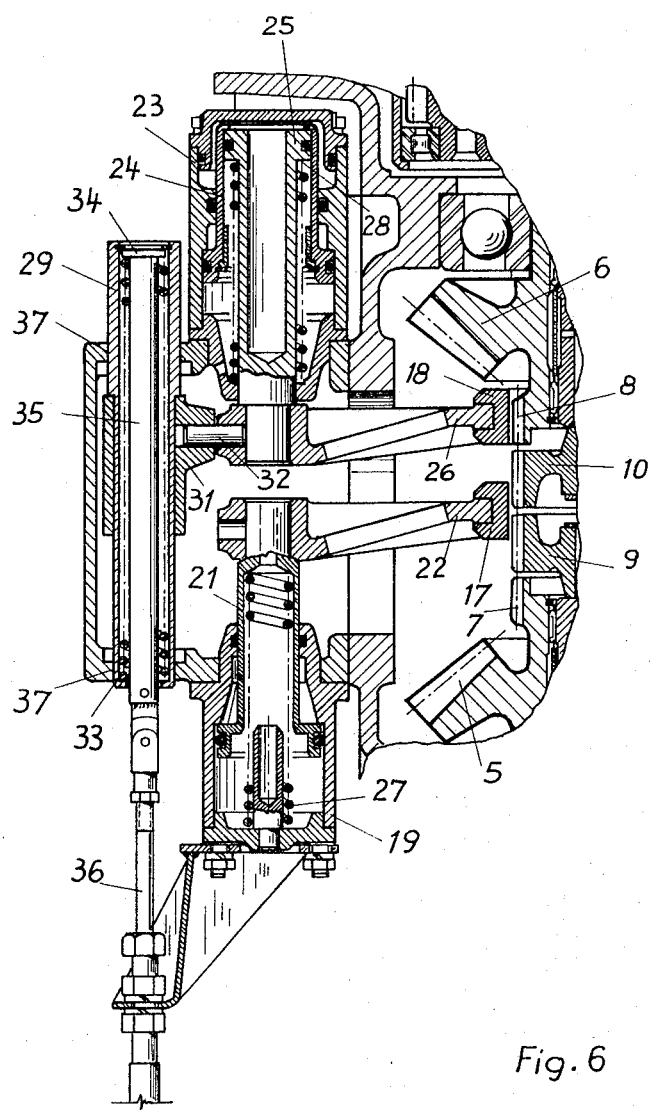
FIG. 6 is a cross-section of a part of the steering gear according to the invention.

The cylinder 19 contains a spring 27, resting against the end wall of the cylinder 19 and against the piston 21, urging the same into the position shown in FIGURES 1, 2 and 6. The cylinder 23 also contains a spring 28, urging the pistons 24, 25 into the position shown in FIGURES 1, 2 and 6.

The position shown corresponds to the towing position. The shift sleeve 18 rests ineffectively on the gear 8. The shift sleeve 17 connects the gears 9 and 10, whilst the steering is disconnected from the stepped transmission 2. The two chain drive wheels 15 and 16 are interconnected through the steering so that the vehicle may be steered by means of the brakes 13 and 14.

Figure 3:
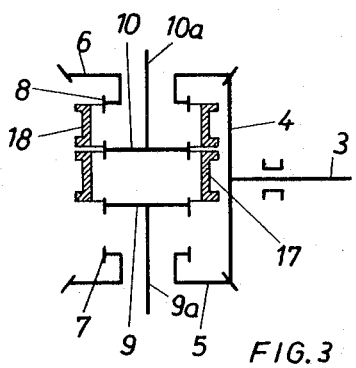
FIG. 3 shows diagrammatically the steering gear in the forward travel position of the vehicle.

If the piston 24 is operated by feeding compressed air into the annular chamber formed between the inner wall of the cylinder 23 and the leading flange of the piston 24 and sealed by O rings, said piston 24 entrains the piston 25, thereby so displacing the shift sleeve 18 by means of the lever 26 that it causes the two gears 8 and 10 to be interconnected, as shown in FIG. 3. This position corresponds to the forward travel position of the vehicle, that is to say, the output shaft 3 of the stepped transmission 2 drives the gear 8 through the bevel gears 4 and 6, and the gears 9 and 10 through the shift sleeves 18 and 19.

If compressed air is now fed into the cylinder 19, causing the piston 21 to be pushed back against the action of the spring 27, the lever 22 causes the shift sleeve 17 to be displaced so that it interconnects the gears 9 and 10. These two gears 9 and 10 are now driven in the opposite sense of rotation, corresponding to the opposite sense of rotation of the bevel gears 5 and 6. In this manner the two chain drive wheels 15 and 16 are also driven in the opposite sense, and the vehicle turns on the spot.

Figure 4:
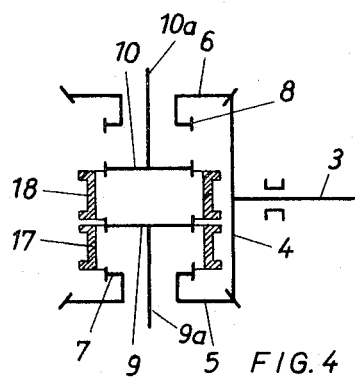
FIG. 4 shows diagrammatically the steering gear in the reverse travel position of the vehicle.
Figure 5:
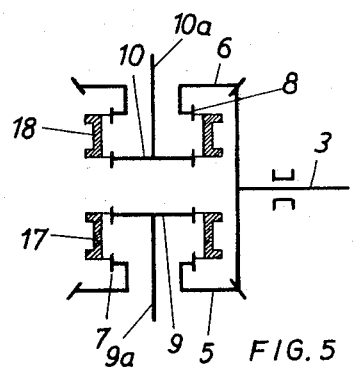
FIG. 5 shows diagrammatically the position for turning on the spot by driving both chains in the opposite sense.

If now the second piston 25 of the compressed air cylinder 23 is actuated, causing it to be displaced with the piston 24, the shift sleeve 18 is so far advanced by means of the lever 26 that it causes the two gears 9 and 10 to be coupled together, whilst the shift sleeve 17 interconnects the two gears 7 and 9. This position is shown in FIG. 4, and corresponds to the reverse travel of the vehicle, that is to say, both chain drive wheels 15 and 16 are driven in the same sense but in the direction opposite to that shown in FIG. 3. This position has the special advantage that all transmission gears 2 are available so that the vehicle can, for example, quickly retreat from the enemy in reverse without having to turn, or that it can surmount steep obstacles in reverse.

In the case of a failure of the compressed air supply, both shift sleeves 17 and 18 return, as already explained, under the action of the springs 27 and 28 into their towing position as shown in FIGURES 1, 2 and 6. In order to make possible the operation of the steering in spite of the failure of the compressed air supply, there is provided a cylinder 29 with a sleeve 31 sliding thereon, which sleeve 31 is connected by a pin 32 with the lever 26. A spring 33 inside the cylinder 29 rests, on the one hand, against the inner wall of the cylinder 29, and on the other hand, against a disc 34 of a rod 35. This rod 35 may be actuated by means of a linkage 36 or a Bowden cable, causing the spring 33 to be compressed by the movement of the disc 34. This pressure causes the cylinder 29 to be moved in its sliding supports 37, carrying along the sleeve 31 and, through the pin 32, also the lever 26. During the initial stages of this movement, first the forward travel position according to FIG. 3 is reached. During the continued movement of the linkage 36, the shift sleeve 18 entrains the shift sleeve 17 so that both sleeves reach the reverse travel position as shown in FIG. 4. When the rod 35 is again pushed back, the sleeves 17 and 18 return under the action of the springs 27 and 28 into the towing position according to FIGURES 1, 2 and 6.

The steering gear according to the present invention combines a high degree of operational comfort with the utmost reliability. With hitherto known steering units, a tank could be towed away only by means of a tow bar, necessitating the towing recovery vehicle to drive quite near to the damaged tank. In the field, this may present great difficulties, for example, if the damaged tank has stopped on a steep slope or in a fold of the terrain. With the steering gear according to the invention, the vehicle may be towed by means of a tow rope of any desired length. The towed vehicle may be steered by muscular effort, simply by operating the corresponding brakes. The application of mechanical forces, such as are required, fer example, with hydraulic units, is eliminated according to the invention, and this is of great importance when the engine has been damaged.

The gears 7 to 10 of the steering may also be replaced by other coupling members, capable of making a positive engagement, such as members with pin engagement, without thereby departing from the principle of the present invention. In this case, the shift sleeves 17 and 18 may be adapted to the special construction of these coupling members.

Having thus fully disclosed my invention, what I claim and desire to secure by Letters Patent is:

1. In a steering gear for tracked vehicles and tanks four coaxially arranged gear wheels, two output shafts, each connected with one of said gear wheels, one input shaft, transmission means, so located between the input shaft and the two remaining of said four gear wheels that these last mentioned two gear wheels are driven by the input shaft in the opposite sense of rotation, two shift sleeves displaceable in the axial direction of said gear wheels into several engaging positions, in which they always positively connect two of said gear wheels, and an actuating device by means of which these two shift sleeves may be moved into their different engaging positions, and controlled by a pressure medium.

2. A steering gear as claimed in claim 1 wherein the said transmission means comprise a bevel gear connected with the input shaft and two further bevel gears connected with the said gear wheels and mating with the first bevel gear.

3. A steering gear as claimed in claim 1, wherein said actuating device contains two compressed air units, the pistons of which are connected with the shift sleeves, and one of which has a telescopic twin piston.

4. A steering gear as claimed in claim 1, wherein the two gear wheels connected to the output shafts are arranged between the two gear wheels driven by the input shaft.

5. A steering gear as claimed in claim 1, wherein the actuating device is operatively connected to a Bowden cable arrangement by means of which one of said two shift sleeves may be moved into its various engaging positions, and wherein it entrains during a part of this movement the remaining shift sleeves so that from the towing position the forward travel position, and by entraining the other shift sleeve, the reverse travel position may be reached.

6. In a steering gear for tracked vehicles or tanks, two output shafts and an input shaft, one output coupling body on each output shaft, two input coupling bodies which are driven by the input shaft in opposite rotational directions in relation to one another, connecting means which, in several shifting positions, selectively connect two adjoining couplings one with the other, said input and said output couplings being gears and all gears serving as couplings having the same diameter and the same cogging.

References Cited by the Examiner
UNITED STATES PATENTS

| | | | |
|---|---|---|---|
| 1,240,423 | 9/1917 | Cole | 74—665 X |
| 1,620,668 | 3/1927 | Lipps | 180—6.66 |
| 1,834,538 | 12/1931 | Sloane | 74—720 |
| 2,521,658 | 9/1950 | Van Voorhis | 74—665 |
| 3,133,455 | 5/1964 | White | 74—720.5 |

DAVID J. WILLIAMOWSKY, *Primary Examiner.*

J. R. BENEFIEL, *Assistant Examiner.*